Sept. 5, 1950 R. B. DOME 2,521,504

TELEVISION SYNCHRONIZING SYSTEM

Filed Dec. 11, 1946

Inventor:
Robert B. Dome,
by Merlon D. Moore
His Attorney.

Patented Sept. 5, 1950

2,521,504

UNITED STATES PATENT OFFICE 2,521,504

TELEVISION SYNCHRONIZING SYSTEM

Robert B. Dome, Bridgeport, Conn., assignor to General Electric Company, a corporation of New York Application December 11, 1946, Serial No. 715,361

5 Claims. (Cl. 178—69.5)

Figure 1:
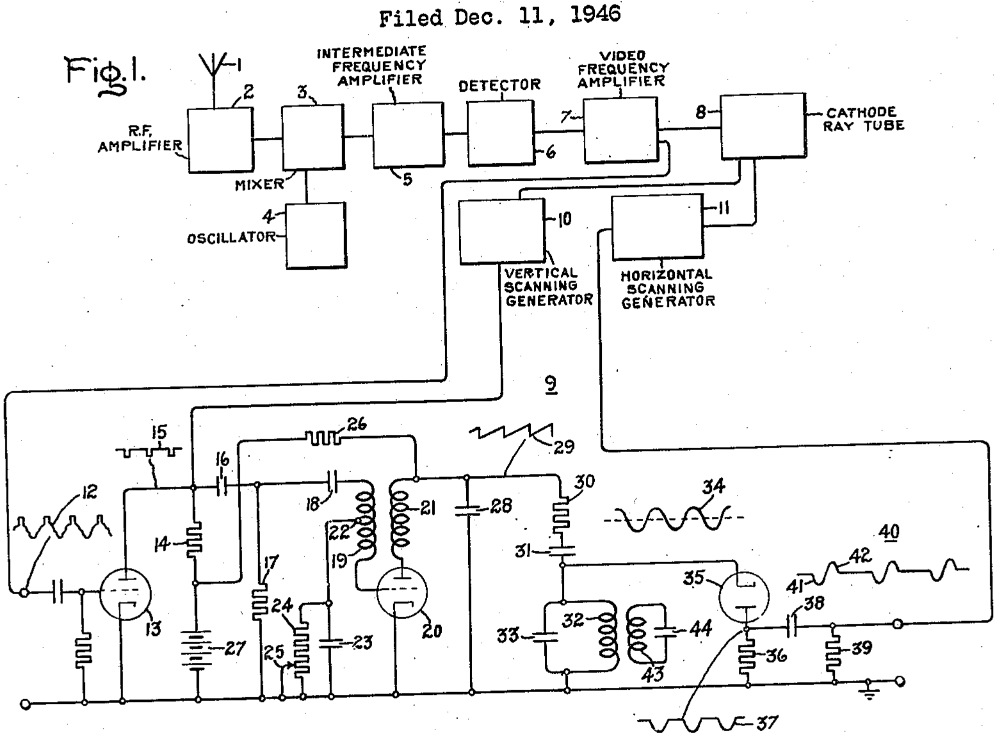

My invention relates to television receivers and, in particular, to circuits for controlling the synchronization of a horizontal scanning generator of a television receiver. It is the primary object of my invention to provide a new and improved continuous and stable horizontal synchronizing control for a television receiver.

In conventional television broadcasting systems, there is radiated from a transmitter and received at the antenna of a receiver a composite video signal which comprises a carrier wave modulated in amplitude with both video signals and synchronizing pulses, the synchronizing pulses comprising horizontal synchronizing pulses of a fundamental frequency, spaced equalizing pulses having a frequency twice that of the horizontal synchronizing pulses, and spaced vertical synchronizing pulses which are interrupted at the rate twice the frequency of the horizontal synchronizing pulses. At the receiver, it is desired to synchronize the sweep circuits of a cathode ray tube of the receiver with those of the transmitter. At the same time, the sweep pattern at the receiver should be reasonably free from the effect of any noise voltages which may be present on a received signal and also sufficiently stable that synchronization is very positive despite changes in receiver condition, power supply voltages, temperature and humidity and changes in the amplitude of the received signals. It has always been desired to obtain both of these characteristics in a synchronizing circuit of a receiver. However, it has been found that circuits which provide stability so that synchronization is retained despite wide variations in operating conditions are frequently adversely affected by noise modulations present on a received signal.

On the other hand, circuits which provide corrections for noise modulations and which are fairly immune thereto usually require a considerable time to obtain synchronization of the scanning circuits of a cathode ray tube of the receiver with the synchronizing pulses of the received signal. Likewise momentary interruptions of the signal in such circuits frequently cause a loss of synchronization and require appreciable time for resynchronizing. It is very desirable, therefore, to provide improved automatic controls for television receivers which are responsive to receive horizontal synchronizing signals, which are substantially unaffected by synchronizing components other than horizontal synchronizing pulses, and which at the same time retain synchronization during widely varying operating conditions.

It is another object of my invention to provide an improved horizontal synchronizing system for a television receiver which is substantially immune to noise modulations present on the received signal.

It is still another object of my invention to provide an improved horizontal synchronizing system for a television receiver which is actuated by received horizontal synchronizing pulses and which remains synchronized despite widely varying conditions of operation and received signal strength.

In its broad aspect, my invention consists in employing the horizontal synchronizing pulses of a received television signal to excite a resonant circuit to produce a sine wave of the frequency of the fundamental component of the horizontal synchronizing pulses. The resonant circuit has a high ratio of stored energy to dissipated energy and is sufficiently loosely coupled to its exciting circuit that it acts substantially as a flywheel of energy and maintains the frequency of the sine wave therein constant at the fundamental frequency of the exciting horizontal synchronizing pulses despite irregularities in the frequency of these pulses caused by noise or any other transient effects and maintains a substantially constant sine wave of voltage despite widely varying conditions of operation including momentary interruptions in received signals and during periods of equalizing synchronizing pulses. The sine wave of voltage, in turn, is used to trigger a horizontal sweep generator so that the sweep pattern of the cathode ray tube of the receiver is exactly in synchronism with that in the transmitter.

In one modification of the invention, a blocking oscillator triggered by received horizontal synchronizing pulses produces a saw-tooth wave of voltage which excites the high quality resonant circuit which produces the sine wave of voltage. In another modification, a multivibrator is employed to excite the resonant circuit and its time constant is adjusted so that it is unaffected by pulses of twice the fundamental frequency of the horizontal synchronizing pulse.

Figure 2:
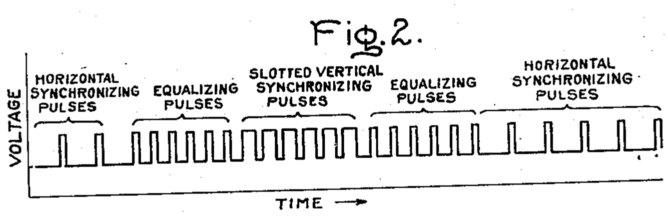
Figure 3:
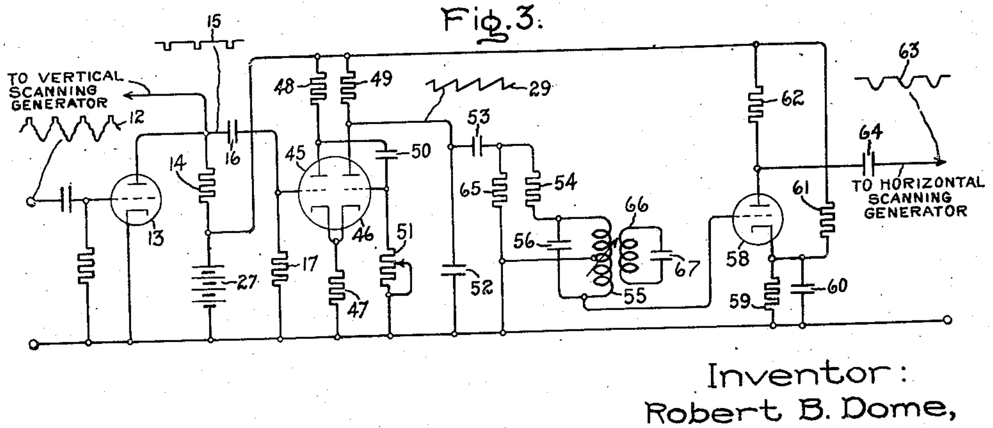

The features of my invention desired to be protected herein are pointed out in the appended claims. The invention itself, however, together with further objects and advantages, may best be understood by the following description taken in connection with the drawings in which Fig. 1 is a circuit diagram, partly schematic, of a complete television receiver of the superheterodyne type including a horizontal synchronizing control system of my invention; Fig. 2 is a curve illustrating the synchronizing pulses of a received television signal; and Fig. 3 is a modification of the control system of the receiver of Fig. 1.

Referring particularly to Fig. 1, there is shown a television receiver of the superheterodyne type comprising an antenna 1 connected to a radio frequency amplifier 2 to supply amplified high frequency signals to a mixer 3. Locally generated oscillations are supplied to mixer 3 from a local oscillator 4 to produce an intermediate frequency wave which is amplified in an intermediate frequency amplifier 5 and detected in a detector 6 to provide video frequency signals. The video frequency signals are amplified in an amplifier 7 and supplied to a cathode ray tube 8, or any other suitable image reproducing device. The synchronizing signal components of the video frequency signals are likewise utilized in a control circuit 9 to provide control voltages for a vertical scanning generator 10 and a horizontal scanning generator 11, the generators 10 and 11 having output circuits connected in the usual manner to ray deflecting circuits of the cathode ray tube 8.

In the control circuit 9, a composite television signal having the form of the illustrated signal 12 is supplied to the control electrode of an electron discharge device 13 which operates as the usual clipper tube to remove the picture modulation components from the composite television signal, reproducing across the anode resistor 14 only the synchronizing signals 15 in a polarity opposite to that in which they appear in the composite television signal 12. The negative synchronizing pulses 15 are differentiated in a differentiating circuit comprising a capacitor 16 and a resistance 17 and are applied through a capacitor 18 and the transformer winding 19 to the control electrode of an electron discharge device 20 which operates as a blocking oscillator discharge device. The blocking oscillator is conventional in form having a secondary winding 21 of the transformer connected in its anode circuit and coupled to the primary winding 19 to provide feedback of energy from the output to the input circuit of the oscillator. In order to cause the primary winding of the transformer to operate as an autotransformer to reverse the phase of the differentiated pulse which is supplied to the control electrode of the device 20 so that positive synchronizing pulses are supplied to this electrode, the primary winding 19 has a center tap 22 which is connected to ground by a grid blocking capacitor 23. I provide means for adjusting the oscillation frequency of the blocking oscillator which comprises a variable grid leak resistance 24 connected across the grid blocking capacitor 23. The time constant of the input circuit may be adjusted by varying the value of the resistance 24 by means of an arm or variable contact 25. The discharge device is supplied with operating potential through a charging resistor 26 connected between the terminal of secondary winding 21 opposite the terminal connected to the anode of device 20 and a source of operating potential illustrated as the battery 27. The junction between resistor 26 and the secondary winding 21 is by-passed to the cathode of the discharge device 20 by means of a capacitor 28.

In operation of the blocking oscillator, the control electrode of the device 20 is supplied with positive pulses of voltage to initiate current flow in the discharge device 20. When the positive pulse of voltage is applied to the grid of device 20, the potential at the point of junction between resistor 26 and the winding 21 is suddenly decreased to a minimum value, due to discharge of capacitor 28 in supplying oscillator anode current. Following the cessation of oscillation, the potential at this junction point gradually rises as capacitor 28 is recharged from battery 27 through resistor 26. As a result, there is produced across the capacitor 28 a saw-tooth wave of voltage 29, the rapid discharge portion of the saw-tooth wave being coincident with the occurrence of the oscillatory state of device 20 and the slow charging portion of the saw-tooth wave being caused by the gradual accumulation of charges across the condenser 28 through the resistor 26.

The saw-tooth wave of voltage 29 contains Fourier harmonic components according to the equation $$b_n=\frac{2}{n^2\pi}\left[\frac{T}{t}\sin\frac{(T-t)\pi n}{T}\right]$$

where $T$=time of whole period
$t$=time of rapid part of cycle (flyback)
$n$=harmonic number in question
$b_n$=amplitude of $n$th sine component.

Thus where $$\frac{T}{t}=10$$

the saw-tooth wave is formed by $$e=E(b_1\sin\phi+b_2\sin 2\phi+\ldots b_n\sin n\phi)$$
$$=E(1.97\sin\phi-0.92\sin 2\phi+0.57\sin 3\phi-\ldots$$

In accordance with my invention, I utilize the fundamental component from this Fourier series to provide a stable source of horizontal synchronizing potentials. To this end, the fundamental component is selected by the use of a network connected across the condenser 28 and comprising series resistance 30, blocking capacitor 31, and a shunt tuned circuit comprising inductance 32 and a capacitor 33 in shunt therewith. The resonant circuit 32, 33 is tuned to the fundamental line or horizontal synchronizing frequency which, in the conventional black and white television system in use today, is 15,750 cycles per second and a sine wave of voltage 34 of this frequency is produced between the upper terminal of the tuned circuit and ground.

In order to utilize the sine wave of voltage 34 across the resonant circuit for control purposes, an electron rectifier 35 and a load resistance 36 are connected in series across the tuned circuit 32, 33. The rectifier 35 has its cathode connected to the upper terminal of the tuned circuit and its anode connected to the resistor 36 so that there is produced across the resistor 36 the negative halves 37 of the sine wave 34. I provide means for differentiating the negative half sine wave 37 which comprises capacitor 38 and resistor 39 connected in series across the resistor 36 to produce a wave of potential 40 which consists of sharp negative and positive going pulses 41, 42 with the leading edge of the negative going pulse 41 coinciding with the leading edge of the original synchronizing pulse in the wave 15. The wave 40 is supplied to the horizontal scanning generator 11 to form the saw-tooth wave of current used in the horizontal scanning of the television picture tube. Vertical synchronizing pulses may be obtained from the upper terminal of resistance 14 and are shown as supplied to the vertical scanning generator 10 from this point.

Referring now to Fig. 2, there is shown a received synchronizing signal which is assumed to be of the conventional composite form and consists of spaced horizontal synchronizing pulses which are followed by a series of equalizing pulses having twice the frequency of the horizontal synchronizing pulses. The equalizing pulses, in turn, are followed by a vertical synchronizing pulse which is broken up into small intervals at twice line frequency so that horizontal synchronization may be maintained during the vertical pulse interval. The vertical synchronizing pulse, in turn, is followed by another series of equalizing pulses which precede the next series of horizontal synchronizing pulses.

In the adjustment of the circuit of Fig. 1, the arm 25 on resistance 24, which controls the periods of conduction of the blocking oscillator tube 20, is adjusted so that this device does not conduct at the double frequency rate which occurs during the equalizing and slotted vertical pulse periods. Instead, the device 20 conducts only at a constant frequency determined by the fundamental frequency of the horizontal synchronizing pulses. Thus, the saw-tooth wave 29 appears continuously without interruption and the equalizing and slotted vertical pulse periods have no effect on the frequency of the saw-tooth wave of voltage.

For reasons now to be considered, the quality or ratio of reactance to resistance of the tuned circuits 32, 33 is made relatively high by causing the resonant circuit to have a high ratio of capacitance to inductance and likewise a high ratio of reactance to the resistance of impedance elements 32, 33. At the same time, resistance 30 is made relatively high so that the resonant circuit is but loosely coupled to the blocking oscillator, the resistance 30 having very little damping effect on the tuned circuit.

If it is assumed that the resonant circuit is so designed that the effective quality factor thereof is Q, then the sine wave 34 builds up or decays according to the exponential $$e=1-\epsilon^{-\frac{\pi f t}{Q}}$$

Thus in one cycle, where $$t=\frac{1}{f}$$

the decay will be $$\Delta e=1-\epsilon^{-\frac{\pi}{Q}}$$

and if Q=20, $$\Delta e=1-\epsilon^{-\frac{\pi}{20}}=1-\epsilon^{-0.157}=1-.86=0.14$$

Thus, at most, each single saw-tooth wave disturbs the resultant wave of the since 34 by 14% of the actual phase error of the individual saw-tooth waves 29.

One of the advantages of the circuit of Fig. 1 is that the frequency of the sine wave 34 is not affected by random noise pulses which occur with the received television signals. Thus, the tuned circuit 32, 33 is excited periodically by pulses corresponding to the resonant frequency so that a sinusoidal voltage appears across that circuit, the frequency of the sine wave being the same as the pulse rate. Any random noise pulses, however, which occur do not provide continuous excitation at the tuned circuit frequency and, hence, have no opportunity of establishing an appreciable voltage which could result in a vector combination with the synchronizing pulses excited wave to give rise to a gross phase error. In effect, therefore, the resonant circuit 32, 33 has a flywheel effect so that the sine wave generated therein is not materially affected by any random noise pulses which are received.

Another advantage of the system of Fig. 1 is that the sine wave 34 is tightly locked in or synchronized with the horizontal synchronizing pulses to provide a very stable system. This is made possible by providing blocking oscillator 20 with an abundance of synchronizing signal. This may be done because noise irregularities produced by strongly synchronized blocking oscillators are ultimately smoothed out by the resonant circuit.

Such a system, incorporating strong synchronizing signals, requires a minimum of adjustment under widely varying operating conditions and when properly adjusted, operates substantially continuously to synchronize the horizontal scanning circuit of the receiver cathode ray tube with the horizontal synchronizing pulses of a received television signal.

In the usual metropolitan area or rural areas which are served by interconnected public utility systems and in which a transmitter may be located, I have found that the frequency of an alternating voltage supplied to the transmitter is sufficiently stable that there is practically no shift in phase with time. However, for cases in which there may be a shift in phase of the voltage supplied to the transmitter and which is used for maintaining the synchronizing pulses at a constant rate, I provide means for maintaining the phase of the sine wave 34 substantially in phase with that of the exciting saw-tooth wave 29 over a frequency band of predetermined width. This means comprises a second tuned circuit comprising inductance 43 and capacitor 44, the inductance 43 being coupled to the inductance 32. The width of this frequency band, by adjustment of the coupling between the inductances 32, 43, may be made as great as ±2% of the center frequency. I have found that such a variation is about the maximum amount which is ever expected to take place in a 60 cycle power line from which the 15,750 cycle per second horizontal scanning frequency is derived. Since the effect of the coupled circuit 43, 44 on the resonant circuit 32, 33 is to reduce the effective Q or quality of the latter resonant circuit, the coupling therebetween should be as small as required to give the desired low phase shift region of frequencies.

In Fig. 3 I have shown a modification of the control circuit of Fig. 1. In this arrangement, the negative synchronizing signals 15 derived from the output of the clipper tube 13 are differentiated in the differentiation circuit comprising capacitor 16 and resistor 17 and applied to one control electrode 45 of a multivibrator comprising a pair of triodes included in the single envelope of an electron discharge device 46. The cathodes of the two triode sections are connected to ground through a resistance 47 and the left- and right-hand anodes are connected, respectively, to the battery 27 through the resistances 48, 49. The left-hand anode is coupled to the right-hand control electrode through a capacitor 50. I provide a variable resistance 51 connected between the right-hand control electrode and ground for adjusting the repetition rate of the multivibrator to cause the multivibrator to operate at the frequency of the television horizontal synchronizing signal. Accordingly, saw-tooth waves of voltage 29 are produced across the condenser 52 by the action of the multivibrator, causing the right-hand section to supply charging current to the capacitor 52 through resistor 49 subsequent to each discharge of this capacitor when pulses of voltage at approximately the correct time spacings are supplied to the control electrode 45. The proper adjustment of resistor 51 renders the multivibrator unresponsive to pulses occurring midway between fundamental pulses. The saw-tooth wave of voltage 29 is applied through a blocking capacitor 53 and a series resistor 54 to a resonant or tuned circuit comprising an inductance 55 and capacitance 56, the mid point of inductance 55 being connected to ground. Through the exciting action of the saw-tooth wave of voltage 29, the tuned circuit comprising elements 55, 56 produces a sine wave of voltage having a frequency equal to the fundamental frequency of the horizontal synchronizing pulse. Alternatively, of course, a pair of serially connected capacitances may be used in place of capacitance 56 and may have their common terminal connected to ground to replace the intermediate tap on inductance 55.

The sine wave of voltage generated in the resonant circuit 55, 56 is supplied in reverse phase to a clipper amplifier electron discharge device 58 by connecting the control electrode of that device to the lower terminal of the resonant circuit. The cathode of the device 58 is connected to ground through bias resistor 59 and is partially by-passed to ground by a shunt capacitor 60 connected across resistor 59. Additional bias for the cathode of the device 58 is supplied by connecting the cathode of the device to the battery 27 through resistor 61. The anode of device 58 is supplied with operating potential from the same battery 27 through an anode resistance 62. Negative synchronizing pulses of the form indicated by the legend 63 are available at the anode of tube 58 and are supplied to a horizontal scanning generator such as the generator 11 of Fig. 1 by coupling such a horizontal scanning generator to the anode of device 58 through the capacitor 64. A return circuit for the control electrode of the clipper amplifier 58 is provided by means of a resistor 65 connected between resistor 54 and ground.

It is to be understood that the remaining elements of the receiver employing the system of Fig. 3 may be identical with those shown in block form in the receiver of Fig. 1. In the operation of such a receiver, the control circuit of Fig. 3 is effective to provide horizontal synchronizing pulses which are effectively synchronized with the horizontal synchronizing pulses of a received television signal and which are substantially free from the effects of noise voltages present on such a received signal. The multivibrator 46 functions as a saw-tooth wave generator utilizing the horizontal synchronizing pulses spaced at a fundamental horizontal rate for triggering purposes. The repetition rate of the multivibrator is controlled by adjustment of the rheostat 51. The resonant or tuned circuit 55, 56 is substantially free running so that its output is relatively unaffected by any irregularities in the recurring saw-teeth of the wave 29 which may be caused by noise present on a received wave or any other undesired voltages. To this end, the tuned circuit 55, 56 has a relatively high Q, the reactance of the circuit being much greater than the resistance thereof. The series resistance 54 preferably likewise is relatively large so that, for all purposes, the tank circuit 55, 56 is substantially weakly coupled to the multivibrator and has the effect of a free running flywheel the speed or frequency of the oscillations of which initially is determined by the horizontal synchronizing pulses and which is very little affected by any sudden irregularity in such pulses.

In the circuit of Fig. 3, the amplifier clipper 58 has the advantage that it gives amplified output so that the resultant synchronizing wave 63 is of relatively high voltage to provide more positive and accurate synchronization. To further enhance the synchronizing effect of the wave 63, by-pass capacitor 60 is so selected that the leading or negative going edge of the wave 63 is steepened without affecting to an appreciable amount the fundamental component of the wave. The device 58, with such choice of the value of the capacitor 60, has a selective degeneration emphasizing the higher frequency components in the output circuits to increase the steepness of the leading edge of wave 63. Resistors 59, 61 likewise are selected to provide essentially cut-off bias for device 58. In this way, the plate current in the device 58 flows in essentially half sine waves.

As pointed out previously in connection with the system of Fig. 1, in the usual television system, the voltage supplied to the transmitter for deriving the horizontal synchronizing frequency is relatively stable and has very little shift in frequency so that the saw-tooth wave 29 derived from the received wave occurs at substantially a constant repetition frequency and there is substantially no phase shift between the sine wave and the transmitted synchronizing pulses over a period of time. However, for use in receivers tuned to receive signals from transmitters in which there may be an appreciable frequency shift in the horizontal synchronizing pulses, I provide a tuned circuit comprising capacitor 67 and inductance 66, the inductance 66 being loosely coupled to inductance 55 of the tank circuit of the control system of Fig. 3. The circuit 68, 66 functions to provide a small frequency range near the resonant frequency of the tank circuit 55, 56 wherein the phase angle remains essentially at zero despite changes in the mean rate of saw-tooth wave 29 over this small range. In this way, I prevent any appreciable picture position shift with moderate changes in the transmitter mean frequency of 15,750 cycles per second wave of the horizontal synchronizing pulses.

By way of illustration only and not in any sense by way of limitation, the following circuit constants are given for a pattern control circuit embodying my invention and utilizing the circuit of Fig. 3:

Multivibrator 46, 6SN7GT
Clipper amplifier 58, 6J5GT
Capacitor 52, 510 mmf.
Capacitor 53, 910 mmf.
Capacitors 16, 56, 250 mmf.
Inductance 20, Variable 290–430 mh.
Resistor 17, 2200 ohms
Resistor 49, 24,000 ohms
Resistor 51, 500,000 ohms
Resistor 54, 330,000 ohms
Resistances 59, 62, 8200 ohms each
Resistor 61, 150,000 ohms
Capacitor 60, 0.003 mfd.

While in the foregoing description, I have described and illustrated modifications employing both a blocking oscillator and a multivibrator for exciting the high quality resonant circuit which provides a stable source of sine wave of voltage of the frequency desired for triggering the horizontal sweep circuits of the cathode ray tube of the receiver, it is apparent that other types of circuits may be employed for this purpose. One of the important features of all such circuits is that they be non-responsive to interposed pulses of twice the fundamental frequency of the horizontal synchronizing pulses present in the transmitted wave and that, while providing excitation for the sine wave of this fundamental frequency, they be sufficiently loosely coupled to the resonant circuit that the resonance frequency of that circuit is substantially unaffected by any sudden irregularities in the fundamental frequency which may be produced by noise present with the received television signals or other transient voltage effects.

While I have shown particular embodiments of my invention, therefore, it is apparent that various modifications may be made, and it will be understood that I do not wish to be limited to the specific embodiments shown but contemplate by the appended claims to cover all such modifications as fall within the true spirit and scope of my invention.

What I claim as new and desire to secure by Letters Patent of the United States is:

1. In a receiver for television signals including horizontal synchronizing pulses, a multivibrator, means utilizing said pulses to operate said multivibrator to produce a saw-tooth wave of voltage of a frequency equal to the fundamental frequency of said pulses, a resonant circuit excited by said voltage to resonate at said fundamental frequency, said circuit having a ratio of reactance to resistance sufficiently large that noise voltages received with said signals have no appreciable effect on the frequency of the oscillations produced therein, means utilizing said sinusoidal wave of voltage for controlling the operation of said receiver, and means coupled to said resonant circuit for maintaining said sinusoidal wave of voltage in phase with said horizontal synchronizing pulses as the phase of said synchronizing pulses is shifted.

2. In a receiver for television signals including horizontal synchronizing pulses, a synchronizing circuit comprising a first resonant circuit excited by said pulses to produce oscillations of the frequency of the fundamental frequency of said pulses, the ratio of the energy stored in said first resonant circuit to the energy dissipated therein being such that oscillations of said frequency are maintained therein in the presence of irregularities in said pulses, a second resonant circuit coupled to said first resonant circuit for maintaining a predetermined time relation between said oscillations and said synchronizing pulses as the phase of said synchronizing pulses is shifted, and means for deriving from said produced oscillations a scanning wave form for said receiver.

3. In a receiver for television signals including horizontal synchronizing pulses, a relaxation oscillator, means utilizing said pulses to control the operation of said oscillator to produce periodic waves of voltage having a frequency equal to the fundamental frequency of said pulses, means responsive to said waves for producing a sinusoidal wave of voltage of said frequencies, means coupled to said sinusoidal producing means for maintaining a predetermined time relation between said sinusoidal wave of voltage and said synchronizing pulses as the phase of said synchronizing pulses is shifted, and means utilizing said sinusoidal wave of voltage for controlling the operation of said receiver.

4. In a receiver for television signals including horizontal synchronizing pulses interrupted by equalizing pulses, a relaxation device, means utilizing said horizontal synchronizing pulses to control the operation of said device to produce a periodic wave of voltage of a frequency equal to the fundamental frequency of said horizontal synchronizing pulses, said device including a time delay circuit of such duration that the operation of said device is not affected by said equalizing pulses, means responsive to said voltage for producing a sinusoidal wave of voltage of said frequency, means coupled to said sinusoidal producing means for maintaining a predetermined time relation between said sinusoidal wave of voltage and said horizontal synchronizing pulses as the phase of said synchronizing pulses is shifted, and means utilizing said sinusoidal wave of voltage for controlling the operation of said receiver.

5. In a receiver for television signals including horizontal synchronizing pulses interrupted by equalizing pulses, a relaxation oscillator, means utilizing said horizontal synchronizing pulses to control the operation of said oscillator to produce a saw-tooth wave of voltage of a frequency equal to the fundamental frequency of the horizontal synchronizing pulses, said oscillator including a circuit for producing a time delay of such duration that the operation of said oscillator is not affected by said equalizing pulses, means responsive to said voltage for producing a sinusoidal wave of voltage, said means including a resonant circuit, means coupled to said sinusoidal voltage producing means for maintaining a desired time relation between said sinusoidal wave of voltage and said horizontal synchronizing pulses comprising a second resonant circuit having a loose coupling with said first resonant circuit, and means utilizing said sinusoidal wave of voltage for controlling the operation of said receiver.

ROBERT B. DOME.

REFERENCES CITED

The following references are of record in the file of this patent:

UNITED STATES PATENTS

| Number | Name | Date |
|---|---|---|
| 2,231,792 | Bingley | Feb. 11, 1941 |
| 2,277,000 | Bingley | Mar. 17, 1942 |
| 2,350,536 | Schlesinger | June 6, 1944 |
| 2,460,112 | Wright | Jan. 25, 1949 |